Jan. 19, 1926.
A. UNGER
1,570,290
HOT AIR REGULATING DEVICE
Filed Feb. 29, 1924
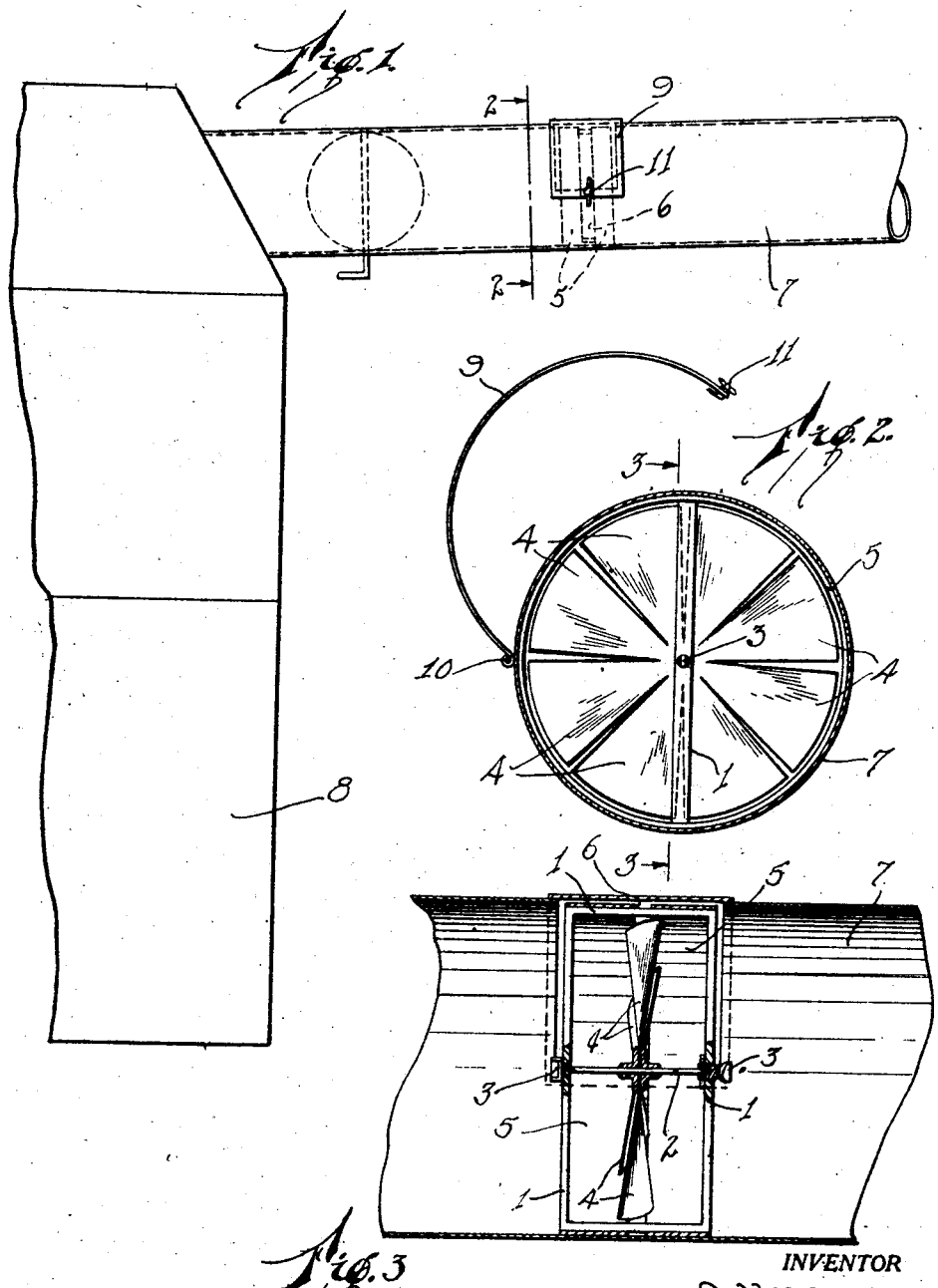

Patented Jan. 19, 1926.

1,570,290

UNITED STATES PATENT OFFICE.

ADOLPH UNGER, OF CHICAGO, ILLINOIS.

HOT-AIR-REGULATING DEVICE.

Application filed February 29, 1924. Serial No. 695,982.

*To all whom it may concern:*

Be it known that I, ADOLPH UNGER, a citizen of Hungary, and a resident of Chicago, in the county of Cook and State of Illinois, have invented a new and useful Improvement in Hot-Air-Regulating Devices, of which the following is a full, clear, and exact description.

My invention relates to improvements in hot air regulating devices, and it consists in the combinations, constructions and arrangements herein described and claimed.

An object of my invention is to provide a device which is adapted for use in pipes leading from hot air furnaces, so as to control the flow of hot air in such a manner that heat is conserved.

A further object of my invention is to provide a device of the type described, which is automatic in use and operation, and which therefore does not require any attention nor any power to operate it.

A further object of my invention is to provide a simple device, which is especially adapted for use with pipes having a long run, or with pipes having a slight inclination, so as to maintain a movement of air in these pipes under conditions which would prevent efficient operation, were this device of mine not used.

Other objects and advantages will appear in the following specification, and the novel features of the invention will be particularly pointed out in the appended claim.

My invention is illustrated in the accompanying drawings, forming part of this application, in which—

Figure 1 is a side view of a furnace and pipe with my invention applied thereto, Figure 2 is an enlarged section along the line 2—2 of Figure 1, and Figure 3 is a section along the line 3—3 of Figure 2.

In carrying out my invention, I provide a rectangular metal frame 1, and at the central part of this frame I suspend a shaft 2. The ends of the shaft are tapered and are arranged to enter the tapered sockets in screw plugs 3 which extend through the side of the frame, and which may be adjusted so as to suspend the shaft very delicately. Secured to the central portion of the shaft are vanes 4, which are made of sheet metal and which are inclined with respect to a plane at right angles to the shaft, so as to present an inclined surface to currents through the pipe.

The frame 1, bearing the vanes 4, which form a wheel, is encircled preferably by two bands 5, which are spaced apart so as to leave an opening 6 between them.

The device as described is designed to be placed in a hot air pipe, such as that shown at 7 in Figure 1, and which leads from the furnace 8. To this end the pipe 7 is provided with a door section 9 which is hinged at 10 and which may have a latch 11.

From the foregoing description of the various parts of the device, the operation thereof may be readily understood. In placing the device in the pipe, the door 9 is raised, and the cylindrical device bearing the wheel is inserted through the opening in contact with the interior portion of the pipe. The door 9 is then closed and latched, and the cylindrical bands, together with the frame and the wheel carried thereby, are securely held by the frictional contact with the walls of the pipe, and especially with the door portion, which may be made of spring metal so as to hold the device in position.

As soon as the furnace is started, the slightest current of hot air through the pipe will start the wheel to rotate. Eventually it will attain the speed which is dependent upon the velocity of the current of hot air.

If now a door, leading to a room into which the pipe 7 discharges, should be opened suddenly, the cold air may tend to drive the hot air rearwardly. If the wheel were not present, this sudden rush of air rearwardly and the consequent cooling of the pipe might put the pipe out of commission entirely, since where a pipe with little inclination is once cooled, it is difficult to again start up the circulation. In the present instance, however, the wheel, owing to its momentum, will tend to oppose the back rush of cold air in the pipe, and when the door of the room is closed, the pipe will again function.

This device is especially adapted for use with pipes leading to rooms on the windward side of houses. If, for instance, when the door is opened, there is a strong wind which tends to blow into the room, it will meet with the resistance of the wheel, so that the hot air in the pipe will not be driven back, as it would be were not the device present.

The use of this device tends to maintain the flow of hot air into rooms under circumstances where such flow could not be maintained without the use of the device. It therefore prevents such rooms from becoming cold under these circumstances, and it causes pipes, having slight elevation or of long run, to function, where they might otherwise not operate satisfactorily. The device requires little or no attention. It does not consume current, as an electric fan would, and if it is desired to inspect it at any time, such inspection may be readily made by merely opening the door and viewing the movement of the vanes in the space 6 between the bands 5. The device may be readily removed if, for any reason, it is desired to remove it.

I claim:

The combination with a hot air pipe having a hinged door, of a cylindrical frame, a rectangular frame carried within said cylindrical frame, and a wheel having vanes inclined with respect to a plane at right angles to the axis of the cylindrical frame, said cylindrical frame being arranged to enter through the door of the pipe and to be retained frictionally in the pipe, by the engagement of the hinged door with the frame, and means for latching the door.

ADOLPH UNGER.